(12) United States Patent
Koudouridis et al.

(10) Patent No.: US 8,843,148 B2
(45) Date of Patent: Sep. 23, 2014

(54) METHOD AND APPARATUS OF COMMUNICATIONS

(71) Applicant: Huawei Technologies Co., Ltd., Guangdong (CN)

(72) Inventors: George Koudouridis, Kista (SE); Tao Cai, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/779,449

(22) Filed: Feb. 27, 2013

(65) Prior Publication Data

US 2013/0196676 A1 Aug. 1, 2013

Related U.S. Application Data

(63) Continuation of application No. PCT/CN2011/077022, filed on Jul. 11, 2011.

(30) Foreign Application Priority Data

Sep. 4, 2010 (WO) ................. PCT/SE2010/000216

(51) Int. Cl.
*H04W 72/00* (2009.01)
*H04W 72/04* (2009.01)
*H04W 28/16* (2009.01)

(52) U.S. Cl.
CPC .............. *H04W 72/04* (2013.01); *H04W 28/16* (2013.01)
USPC ..................... 455/450; 455/451.1; 455/451.2; 455/453

(58) Field of Classification Search
CPC ................................................... H04W 72/00
USPC .......................................................... 455/450
See application file for complete search history.

(56) References Cited

U.S. PATENT DOCUMENTS

| 2006/0223540 | A1 | 10/2006 | Chuang et al. |
| 2010/0248728 | A1* | 9/2010 | Sun et al. ........................ 455/450 |
| 2011/0211618 | A1 | 9/2011 | Oyman et al. |

FOREIGN PATENT DOCUMENTS

| CN | 1722893 A | 1/2006 |
| CN | 101282161 A | 10/2008 |
| CN | 101610518 A | 12/2009 |

OTHER PUBLICATIONS

International Search Report in corresponding International Patent Application No. PCT/CN2011/077022 (Oct. 13, 2011).
Written Opinion of the International Searching Authority in corresponding International Patent Application No. PCT/CN2011/077022 (Oct. 13, 2011).
"TR 25.814—3rd Generation Partnership Project; Technical Specification Group Radio Access Network; Physical layer aspects for evolved Universal Terrestrial Radio Access (UTRA) (Release 7)," Technical Report, Jun. 2009, V7.1.0, 3GPP, Valbonne, France.
Wang et al., "An Interference Aware Dynamic Spectrum Sharing Algorithm for Local Area LTE-Advanced Networks," 2009, IEEE, New York, New York.

(Continued)

*Primary Examiner* — Huy C Ho
(74) *Attorney, Agent, or Firm* — Leydig, Voit & Mayer, Ltd.

(57) ABSTRACT

Channel resource allocation is disclosed. Embodiments of channel resource allocation allocate channel resources to plural cells or cell sections according to a classification depending on distribution statistics.

18 Claims, 5 Drawing Sheets

(56) References Cited

OTHER PUBLICATIONS

Simonsson, Arne, "Frequency Reuse and Intercell Interference Co-ordination in E-UTRA," 2007, IEEE, New York, New York.

Xiang et al., "Inter-cell Interference Mitigation through Flexible Resource Reuse in OFDMA based Communication Networks," 2007, European Wireless.

Koudouridis et al., "Partial Frequency Allocation in Downlink OFDMA based on Evolutionary Algorithms," IEEE Vehicular Technology Conference, Sep. 6-9, 2010, IEEE, New York, New York.

"R1-051059—Inter-Cell Interference Mitigation for EUTRA," 3GPP TSG RAN WG1, Oct. 10-14, 2005, 3GPP, Valbonne, France.

"R1-060368—Performance of Inter-Cell Interference Mitigation with Semi-Static Frequency Planning for EUTRA Downlink," 3GPP TSG RAN WG1#44, Feb. 13-17, 2006, 3GPP, Valbonne, France.

Renaud et al., "Evolutionary Methods and Operators for Frequency Assignment Problem," Speedup Journal, vol. 11, No. 2, Sep. 18-19, 1997, Zurich, Switzerland.

\* cited by examiner

METHOD AND APPARATUS OF COMMUNICATIONS

CROSS-REFERENCE TO RELATED APPLICATIONS

This application is a continuation of International Patent Application No. PCT/CN2011/077022, filed on Jul. 11, 2011, which claims priority to International Application No. PCT/SE2010/000216, filed on Sep. 4, 2010, both of which are hereby incorporated by reference in their entireties.

TECHNICAL FIELD

The technical field of multi-user wireless communications provides relevant art of technology for this specification of an invention. This may also be the case for a technical field of surface covering wireless communications, channel resource allocation, orthogonal frequency division multiplex or multiple access, or recursive methods and systems, where a recursion is based on an evolutionary process.

BACKGROUND

Wireless communications provide a means of communicating across a distance by means of electromagnetic signals. In an environment of plural electrical signals the signals may interfere, thereby rendering the signals difficult to detect reliably. This may particularly be the case in multi-user systems where signals of different users may interfere. By allocating signals of different users to different channels or channel resources, such interference may be reduced or eliminated.

Due to the limited availability of channel resources, e.g. in terms of radio frequency spectrum or light spectrum, to cover a surface may require some of the channel resources to be re-used at different locations along the covered surface. For this purpose available channel resources may be divided into one or more groups. Further, the surface to be covered by wireless services or communications is divided into a plurality of smaller, preferably but not necessarily non-overlapping, areas. These smaller areas are referred to as cells, and are generally defined in terms of the wireless coverage, such as radio coverage of a channel group of a particular radio transmitter of the cell, where the transmitter forms part of a base station providing wireless coverage of the cell.

The number of groups is associated with particular reuse-patterns of preferred allocation of channel groups to the various cells (or part of cell) covering the surface of interest. Such reuse is referred to as K-reuse, where K represents the number of groups of such reuse.

3GPP TR 25.814 V7.1.0, Technical report; 3rd Generation Partnership Project; Technical Specification Group Radio Access Network; Physical layer aspects for evolved Universal Terrestrial Radio Access (UTRA) (Release 7), France, September 2006, is related to the 5 technical report for physical layer aspect of the study item "Evolved UTRA and UTRAN" and considers in sections 7.1.2.6 and 9.1.2.7 "Inter-cell interference mitigation" three basic approaches to inter-cell interference mitigation:
  Co-ordination/avoidance
  Inter-cell-interference randomization, and
  Inter-cell-interference cancellation.
  For the uplink, also
  Frequency domain spreading
  is considered.

In addition, the use of
  Beam-forming antenna solutions at the base station
  is a general method that can also be seen as a means for downlink inter-cell-interference mitigation.

As regards the coordination/avoidance, the 3GPP technical report concludes that the common theme of inter-cell-interference co-ordination/avoidance is to apply restrictions to the resource management (configuration for the common channels and scheduling for the non common channels) in a coordinated way between cells. These restrictions can be in the form of restrictions to what time/frequency resources are available to the resource manager or restrictions on the transmit power that can be applied to certain time/frequency resources. Such restrictions in a cell will provide the possibility for improvement in SIR, and cell-edge data-rates/coverage, on the corresponding time/frequency resources in a neighbor cell.

In the 3GPP technical report, for static interference co-ordination reconfiguration of the restrictions is done on a time scale corresponding to days. The inter-node communication is very limited (set up of restrictions), basically with a rate of in the order of once per day, whereas for semi-static interference co-ordination, reconfiguration of the restrictions is done on a time scale corresponding to seconds or longer. Inter-node communication corresponds to information needed to decide on reconfiguration of the scheduler restrictions (examples of communicated information: traffic-distribution within the different cells, uplink interference contribution from cell A to cell B, etc.) as well as the actual reconfiguration decisions. For semi-static interference co-ordination, signaling rate is in the order of tens of seconds to minutes.

Arne Simonsson, "*Frequency Reuse and Intercell Interference Co-ordination in E-UTRA*", VTC 2007-Spring, IEEE 65th, 22-25 Apr. 2007, pp. 3091-3095, evaluates some basic schemes of intercell interference co-ordination by means of simulations. Anticipating a uniform user distribution, it is concluded that of the static schemes 1-reuse performs the best for wideband services and that a dynamic scheme is required to improve compared to 1-reuse.

Wang et al., "*An Interference Aware Dynamic Spectrum Sharing Algorithm for Local Area LTE-Advanced Networks*", VIC 2009-Fall, 2009 IEEE 70th, 20-23 Sep. 2009, discloses a dynamic spectrum sharing algorithm to minimize inter-cell interference. The algorithm operates in a self-organized manner without the need of any centralized control and is evaluated in the context of LTE-Advanced Downlink transmission. Average cell throughput, average cell load, cell edge user throughput and spectrum allocation interval are used as performance metrics for the evaluation.

D. Renaud and A. Caminada, "*Evolutionary Methods and Operators for Frequency Assignment Problem*", Speed Lip Journal 11(2), pp. 27-32, Proceedings 22nd Workshop, 18-19 Sep. 1997, briefly describes evolutionary methods in a context of interference minimization. Renaud and Caminada state that a frequency assignment problem may be understood as an optimization problem where the subject is to minimize co5 channel and adjacent-channel interference and further states that the optimization problem may be reduced to the graph coloring problem which is an NP-complete combinatorial problem. For the genetic coding of their evolutionary method, a chromosome representation for the frequency assignment problem is illustrated, where the length of the chromosome is equal to the total traffic of the network and one chromosome in each gene corresponds to a particular frequency in a particular cell.

Y. Xiang et al. "*Inter-cell Interference Mitigation through Flexible Resource Reuse in OFDMA based Communication*

Networks", In Proc. 13th European Wireless Conference EW2 007, examines flexible radio resource reuse schemes for the downlink. The cell capacity under some presented reuse schemes is estimated and compared.

Texas Instruments: "*Inter-Cell Interference Mitigation for EUTRA*", 3GPP TSG RAN WGJ, R1-051059, 10-14 Oct. 2005, proposes frequency scheduling coordination for interference avoidance near the cell edge in an attempt to provide a service quality largely independent of UE (User Equipment) location. A soft reuse principle is applied for the allocation of frequency sub-bands in adjacent cells. This allocation is achieved through semi-static network coordination taking into account the traffic load, i.e. the distribution (location and/or transmit power requirements) and throughput requirements of UEs near the edge of each cell.

The 3GPP proposal concludes that a semi-static coordination of reserved frequency sub-bands among cells is preferable for LTE in order to more effectively address the varying throughput requirements and UE populations near the cell edge. Semi-static coordination may be achieved, for example, by the Node Bs communicating to the RNC their throughput requirements near the cell edge and with the RNC communicating to the Node Bs the partition of corresponding reserved frequency sub-bands. Combining frequency and time scheduling allows for even better flexibility in resource allocation and managing dynamic traffic loads near the cell edges thereby improving throughput performance. Similar to frequency coordination, time coordination can be static or semi-static with the latter allowing for more efficient resource allocation. FIG. 1 illustrates an example cell pattern for K=3 channel groups. Cell 1 is allocated a first reserved frequency sub-band, Cells 2, 4, and 6 are allocated a second reserved frequency sub-band, and Cells 3, 5, and 7 are allocated a third reserved frequency sub-band. Certain frequency sub-bands are reserved in each cell for use by UEs near the edge (UEs requiring high transmission power). UEs located toward the cell interior have available for scheduling the remaining frequency sub-bands and possibly some of the reserved sub-bands, if they were not allocated to UEs near the cell edge. The size of the reserved frequency sub-bands depends on the traffic load near the cell edge.

Texas Instruments: "*Performance of Inter-Cell Interference Mitigation with Semi-Static Frequency Planning for EUTRA Downlink*", 3GPP TSG RAN WG1, R1-051059, 13-17 Feb. 2006, considers performance of ICI mitigation based on the soft reuse principle for the allocation of reserved frequency sub-bands in adjacent cells in proposal R1-051059 above.

The inventor of the present invention finds that: Not at least during an early phase of newly commissioned networks, user distribution tends to be far from uniform both within cells and considering an area corresponding to plural cells. In order to facilitate establishment of new networks and also to run well-established networks efficiently, network equipment need allow efficient operations despite non-uniform user or traffic distributions. Cited prior art does not identify or benefit from the fact that users e.g. being further away from their serving base station may demonstrate a greater variance in experienced interference, e.g. downlink interference from surrounding base station serving user's of other cells as compared to users closer to their serving base stations.

SUMMARY

Embodiments of the present invention provide a method and apparatus of allocating channel resources in relation to a classification of users/user equipment devices or cells/cell sections in a communications system.

It is further an object of example embodiments of the invention to allocate channel resources to a class of users or user equipment devices, while the allocation not necessarily satisfies for all users or user equipment devices of that class a minimum requirement of communications on the channel resource.

It is also an object of embodiments of the invention to facilitate determining of and discriminating between merits of (candidate) allocations of channel resources.

Further it is an object of an embodiment of the invention to realize processing and equipment for determining a preferable allocation from one or more parameters reflecting user distribution or traffic load distribution.

Finally, it is an object of preferred embodiments of the invention to design a recursion that runs sufficiently fast to be capable of converging to an efficient allocation on a same or faster time-scale than for variations of user or traffic variations.

The embodied invention provides a method and equipment of channel resource allocation classifying one or more targets/target groups of the allocation (users, user equipment devices or communications), or corresponding cells/cell sections in an area of wireless service according to a representation of potential susceptibility to one or more disturbances (e.g. interference) and balancing the amount of channel resources allocated to the various classes versus experienced susceptibility according to a statistically based measure (e.g. expected value, or percentile) as described in detail below.

DETAILED DESCRIPTION

Figure 1:
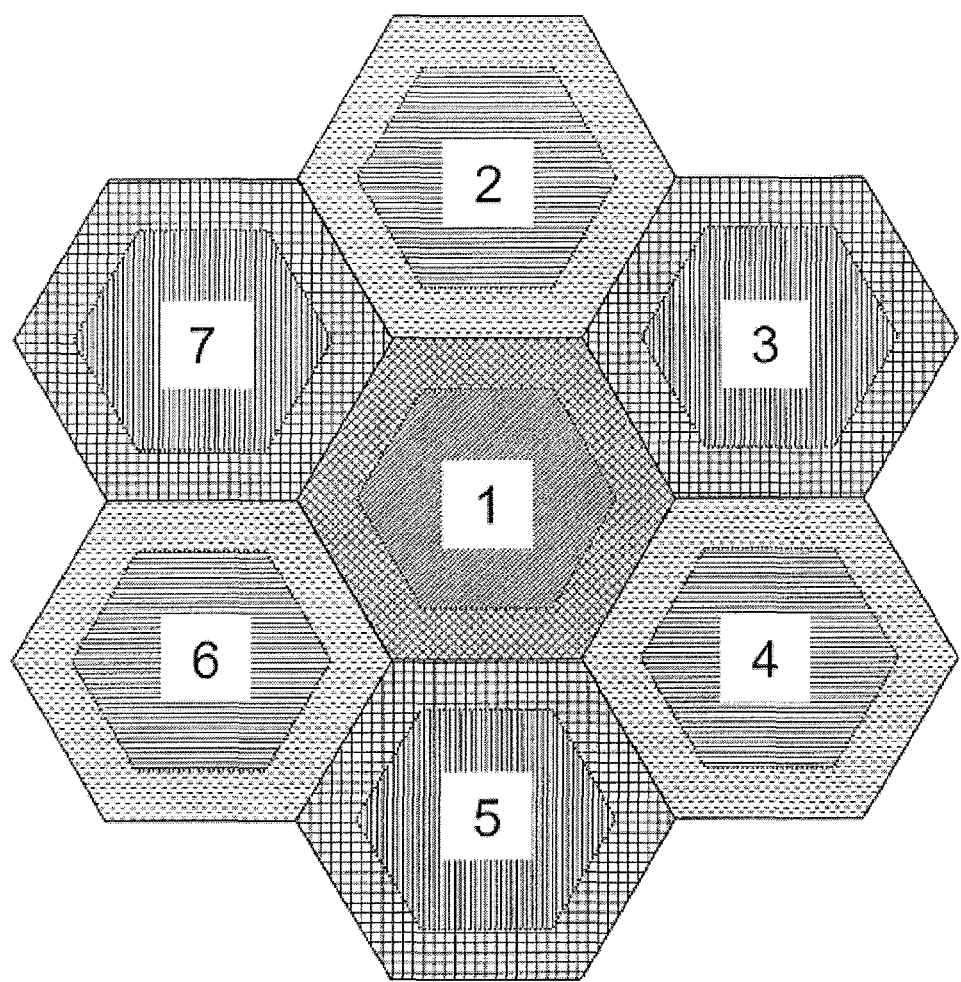
FIG. 1 illustrates an example cell pattern for K=3 channel groups according to prior art.

Every new generation of mobile networks aims at evolving the radio-access technology towards higher spectrum efficiency, higher data rates and lower latencies. In cellular wireless communications networks, one of the limiting factors towards this end is interference among cells utilizing a common spectrum. Universal reuse of radio spectrum, known as frequency reuse of factor 1 (1-reuse) gives rise to high inter-cell interference especially at the cell fringe. User Equipment devices located close to the cell edge are more susceptible to inter-cell interference. Due to their lower Signal to Interference and Noise Ratio (SINR), and as a consequence lower throughput, there have been many proposals suggesting fractional frequency reuse (FFR), also known as soft frequency reuse. As referred to in the background section, FFR divides users into cell-center users (CCUs), and cell-edge users (CEUs), based on their location or other information.

In this context it may be worth mentioning that the "edge region" of each cell may be defined geographically, at least to simplify understanding. Though, it may also be considered electrically, being defined by, e.g., signal strength or signal quality of received wireless signals, such as radio signals.

Anticipating cells with base stations in the center of each cell and CCUs and CEUs using the same reuse factor, it is observed that for a maximum downlink interference of CCUs, limited due to distance from (potentially) interfering transmitters/base stations, CEUs may be closer to the interfering transmitter and suffer from greater downlink interference. Preferably, channel resources applied for CEUs are made orthogonal/non-interfering for adjacent cells, thereby increasing the distance to interfering transmitters/base stations, while the channel resources applied for CCUs need not be made orthogonal/non-interfering as such. As in cited prior art, of course channel resources intended for CEUs but not needed by the CEUs in a particular traffic situation may be applied by CCUs.

There is a huge amount of prior art solutions for (static) allocation of channel resources to guarantee a certain minimum performance requirement in a worst case scenario.

However, in case of an (from a view-point of interference) advantageous user distribution, CEUs (anticipated to suffer the most in a worst case scenario) may actually experience a smaller interference than CCUs, despite allocated to as such non-orthogonal/interfering channel resources, this being due to a possible actual location further away from the interfering transmitter/base station. Consequently, it is possible to benefit from non-uniform user or traffic distribution by careful allocation of channel resources. This may be referred to as a statistical channel resource allocation. Preferably, such a careful allocation should be capable of adaptation to user or traffic distribution changes. Example embodiments in accordance with the invention demonstrate both such benefiting and adapting on a relevant time-scale.

Figure 2:
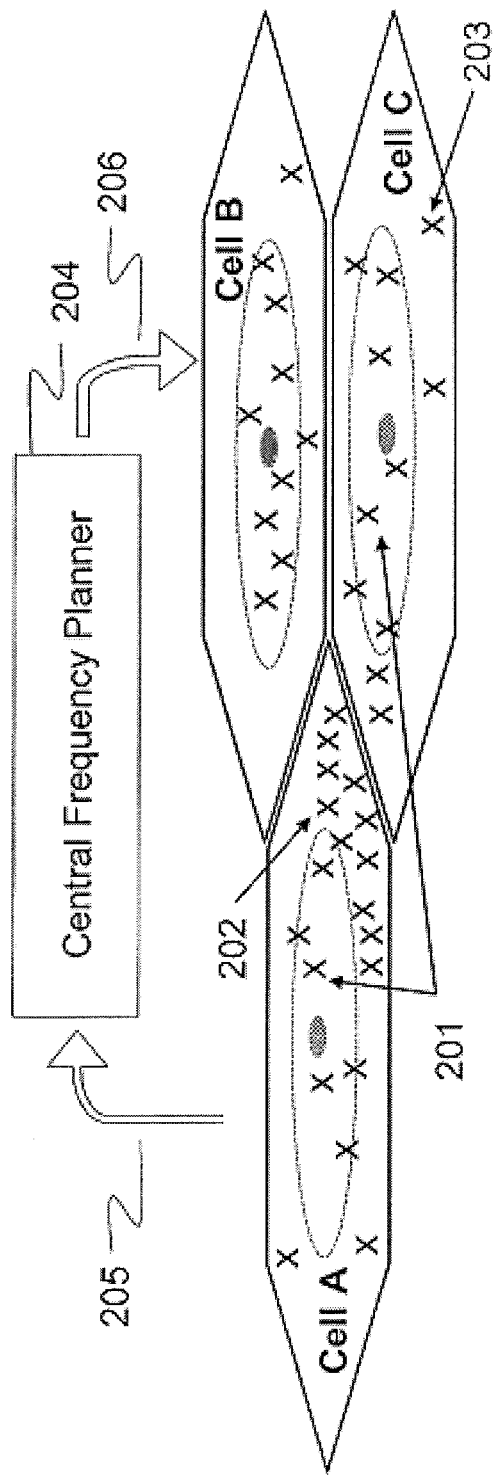
FIG. 2 illustrates an example network topology in accordance with the invention.

FIG. 2 illustrates an example network topology in accordance with the invention. In the figure three cells are schematically illustrated, which of course is just an example number for the purpose of illustration. For each cell, two parts are considered—a center part and an edge part—preferably determined in relation to signal propagation properties. For each part users are for simplicity referred to as cell center users (201) and cell edge users (202, 203). In an embodiment in accordance with the example network topology, adaptive partial frequency reuse is planned off-line by a central frequency planner (204) responsible for frequency assignment of a plurality of cells. In a preferred embodiment, such central frequency planner (204) is part of a communication system configuration management entity responsible for control and configuration of radio access and core networks of the wireless communications system. Performance measurements and user and traffic statistics, such as user distribution and load distribution, is collected (205) for the various cells for the central frequency planning providing a frequency reuse plan as output (206) from its central processing in corresponding central processing circuitry.

Figure 3:
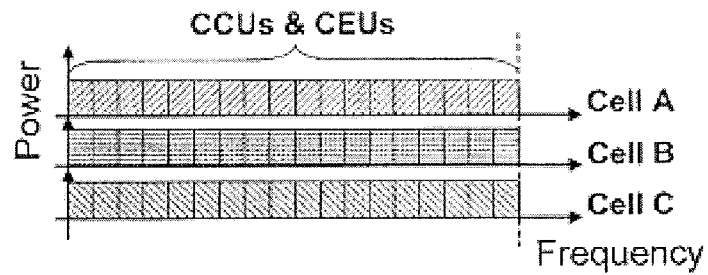
FIG. 3 illustrates a frequency assignment of re-use 1, known as such in the art.
Figure 4:
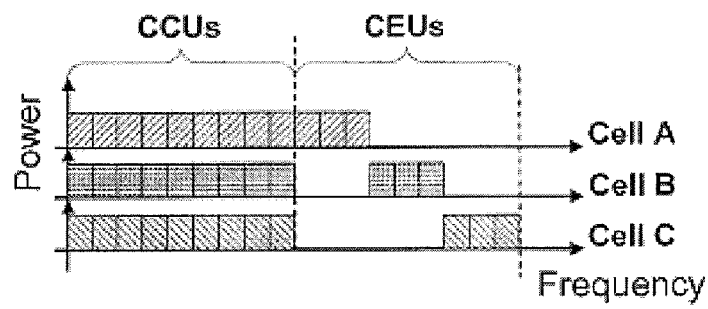
FIG. 4 shows an example static assignment where 1-reuse is applied for cell center users and 3-reuse is applied for cell edge users.
Figure 5:
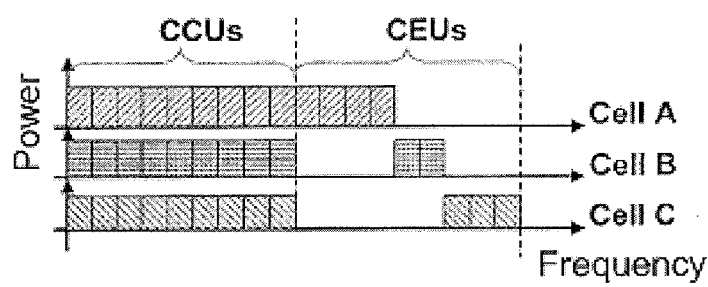
FIG. 5 schematically illustrates an example situation where a cell with high load at the cell edge (Cell A) gets a larger number of edge resources than a cell (Cell B) with low traffic load at the cell edge in accordance with embodiments of the invention.
Figure 6:
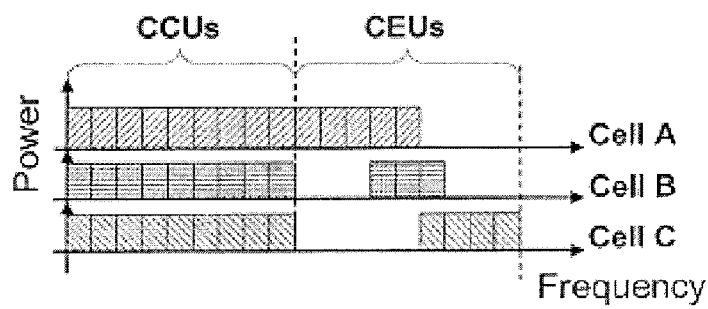
FIG. 6 illustrates a snap-shot of allocation with adaptive partial reuse where edge resources are partially overlapping in different cells in accordance with embodiments of the invention.

FIGS. 3-6 illustrate some example allocations for channel resources defined in tennis of frequency intervals. In FIG. 3, a static assignment of frequencies (channel resources of the example) for 1-reuse is illustrated where all users in a cell share may be allocated any channel resource available to the system. In FIG. 4, an example assignment where 1-reuse is applied for CCUs and 3-reuse is applied for CEUs is illustrated. In the static assignment no information on particular user distribution is applied and the channels in the 3-reuse part are split equally between the different channel groups for CEUs. In the example CEUs are allocated higher frequencies than CCUs. This is just for the purpose of illustration. CEUs could be allocated frequencies lower than the CCUs or be allocated channel resources with other interrelationships without departing from the scope of this invention. In FIG. 5, a cell with high load at the cell edge (Cell A) gets a larger number of edge resources than a cell (Cell B) with low traffic load at the cell edge. Finally, in FIG. 6 an adaptive partial reuse is illustrated where edge resources are partially overlapping in different cells. Cells located in a position that from an interference perspective is favorable may be allocated such resource without severe negative on their impact or causing severe interference in other cells, thereby improving on cell throughput. When users are moving with their UE devices the channel resource allocation on individual bases need adapt accordingly. Also load statistics may vary over time, for which reason the number of channel resources assigned to the various cells/edge regions is preferably adapted thereto for preserved good or excellent performance balancing frequency reuse factor and perceived interference level. According to an example embodiment such frequency planning is achieved through an evolutionary method applying a genetic recursion as will be explained in detail below.

In FIGS. 3-6 some of the merits of the invention are explained using (for CCU5) 1- and (for CEUs) 3-reuse patterns as examples. The invention does not exclude that other numbers of channel groups are applied neither for CCUs nor for CEUs.

Figure 7:
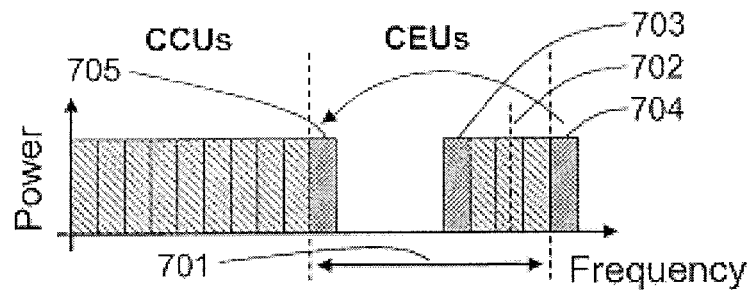
FIG. 7 illustrates an example centric expansion of resource allocation illustrated in a single dimension (frequency) in accordance with an embodiment of the invention.

According to an embodiment, channel assignment of CEUs is arranged around a center frequency (or equivalently other resource) (702) and extending symmetrically around that center frequency within the allowable range (701) of the resource allowed for CEUs, as schematically illustrated in FIG. 7. In case of an upper or lower limit of that range is exceeded, the extension is expanded cyclically (704), (705) to stay within the allowable range (and the resource (704) outside allowable range is not allocated). Considering a single range does not exclude that such range is chopped into smaller pieces while allocated considering the various pieces as part of a whole, the range limited by upper and lower limits of this whole. Due to such or equivalent elaborate allocation of the actual one or more resources, impact of interference may be kept smaller as compared to randomly allocating resources in the range of consideration.

FIG. 7 illustrates an example of such centric expansion illustrated in a single dimension (frequency). The example does not exclude that, for channel resources defined over more than one dimension, a corresponding approach is applied in more than one dimension (e.g. time or code).

According to the invention, and as illustrated in FIGS. 3-7, some channel resources (frequency intervals) are kept static or semi-static applying a relatively small reuse factor (1 in the illustrated example), while other channel resources are assigned to their respective cells adaptively in accordance with load distribution. Consequently, out of a great number of channel resources, a subset thereof is considered for the adaptation. According to preferred embodiments of the invention, much of the processing is made centrally in what may be referred to as a Central Frequency Planner planning channel resource allocation for all cells or a subset thereof. The channel resources, in the sequel referred to as PRBs (Physical Resource Blocks) in accordance with terminology of, e.g., LTE technology, though without being limited thereto. Considering the frequency intervals/resources of the edge resources, they are preferably represented by a vector, s, comprising the number of PRBs of each cell edge region.

$$s=[x_1, x_2, \ldots, x_n]. \quad (eq. 1)$$

In the vector s, the number of elements, n, corresponds to the number of cells or cell edge regions of consideration.

Adaption of the vector, s, versus load distribution is made by means of an objective function, f(s). In accordance with embodiments of the invention, system throughput and system cell edge throughput are considered advantageous single objectives for such a function. For an objective function $f_s(s)$ reflecting System throughput in terms of sum of cell throughput of all cells of consideration of the network, and an objective function $f_{CE}(s)$ reflecting Cell Edge throughput in terms of the 5% point of a cumulative distribution function, CDF, of user throughput, an aggregated objective function reflecting cell throughput is achieved from a weighted sum of the System throughput and the Cell Edge throughput, $$f(s) = \frac{w \cdot f_S(s)}{\max_{s_{\mathcal{H}} \in \mathcal{H}} f_S(s_{\mathcal{H}})} + \frac{(1-w) \cdot f_{CE}(s)}{\max_{s_{\mathcal{H}} \in \mathcal{H}} f_{CE}(s_{\mathcal{H}})}, \quad (eq. 2)$$

where $\mathcal{H}$ is a set of h candidate solutions, $\mathcal{H} = \{s_j\}_i^h = 1$, for an integer h.

With a multi-objective function, for which genetic methods are particularly useful, a plurality of objective criteria are considered, each corresponding to a performance objective. According to an embodiment of the invention, the objective functions are evaluated for a set of candidate frequency allocations and a weighted sum of the various objectives is applied as an aggregate objective function for evaluation. Generalizing equation (eq. 2), an aggregated objective function for evaluating a solution of $\mathcal{H}$, is $$f(f) = \sum_k \frac{w_k \cdot f_k(s)}{\max_{s_{\mathcal{H}} \in \mathcal{H}} f_k(s_{\mathcal{H}})}, \quad (eq. 3)$$

where $$f = f(s) = [f_1(s), f_2(s), \ldots, f_k(s)]. \quad (eq. 4)$$

Numerical optimization known in the art as such, e.g. steepest descent methods inclusive of stochastic versions such as expressed in a Least Mean Square algorithm may be applied for maximizing an objective function. According to a preferred embodiment of the invention, processing according to an evolutionary method is applied, which may be expressed in terms of a genetic process.

A candidate solution, also referred to as a chromosome using genetic terminology comprises a number of genes corresponding to decision variables. Using the notion of representation as above, the vector s is a chromosome and its elements are its genes x1, x2, . . . , xn. In a preferred representation, each gene corresponds to a number of allocated PRBs to cell edge section or corresponding section of a cell, or rather to users being classified as belonging to such a section. Consequently, there is a gene for each such section. Sections/edge bands of consideration, e.g. sections of a particular reuse factor, are included while the chromosome need not necessarily include all frequency bands or PRBs available to the system.

Figure 8:
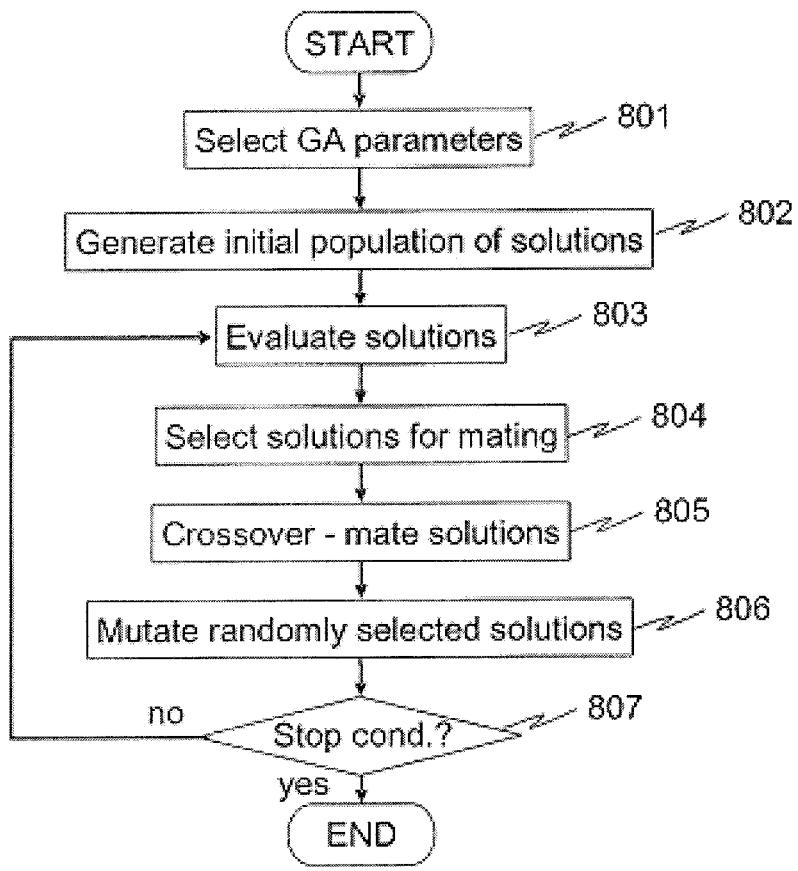
FIG. 8 illustrates in principle a flow chart of an evolutionary process in accordance with an embodiment of the invention.

FIG. 8 illustrates in principle a flow chart of the evolutionary process in accordance with an embodiment of the invention. Inputs (801) to the genetic processing includes 15 population size, h, and parameters governing the generation of successor populations, such as fraction of a population to be replaced by a cross-over operation, and a mutation rate. An initial population is generated (802) comprising randomly generated decision variables, e.g. anticipating the various decision variables x being uniformly distributed within an allowable range [min(xi), max(xi)].

The generation of the initial population is then completed (802) by adding two solutions corresponding to static frequency allocation of relevant reuse factors, e.g. 1-reuse and 3-reuse (c.f. examples of FIGS. 3 and 4).

In an iterative process (803)-(807), a fitness value of each solution of a population, $\mathcal{H}$ is determined (803) based on an objective function, such as the objective function in equation (eq. 2). A population of next iteration/generation is determined as follows: The h members of the population of the existing generation are ranked according to their fitness, such as according to fs(s), fCE(s) or a weighted sum thereof. The best performing (1−r) h members, where r is less than 1, of $\mathcal{H}$ are maintained and r·h worst performing members are discarded and replaced by members resulting from a cross-over (805) based on the maintained members, as explained further below in relation to FIG. 9. A percentage of the thus generated h members of the next generation are mutated (806). Preferably the solutions to mutate are selected (pseudo-)randomly according to a uniform probability distribution. For each solution/member/chromosome to be mutated, preferably a single variable/gene is replace by a (pseudo-)randomly selected variable in the range relevance ([min(xi), max(xi)] for variable xi). A single digit mutation percentage is preferably selected. A simple stop condition (807) may be a threshold on maximum number of iterations or maximum time available to run the recursion, after which it ends possible to be started anew to find a next solution adapted to new conditions of operations, such as a new user or communications traffic distribution.

Figure 9:
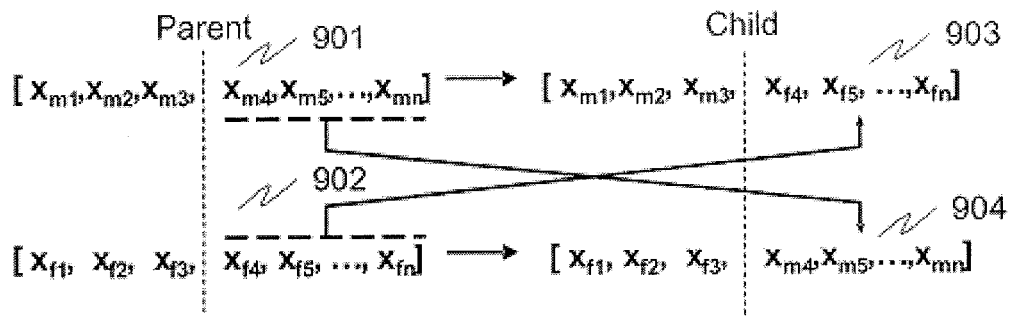
FIG. 9 illustrates schematically an example crossover operation in accordance with an embodiment of the invention.

FIG. 9 illustrates schematically a crossover operation, where two children (903), (904) are generated from two parents (mother (901) and father (902)). The first example child (903) is generated by having the first three variables from the mother (901) and the last n−3 variables from the father (902), while the second example child (904) has its first three elements from the father (902) and the last n−3 elements from the mother (901). Of course this example of illustration does not exclude that more or less genes/variables are inherited from each parent.

Figure 10:
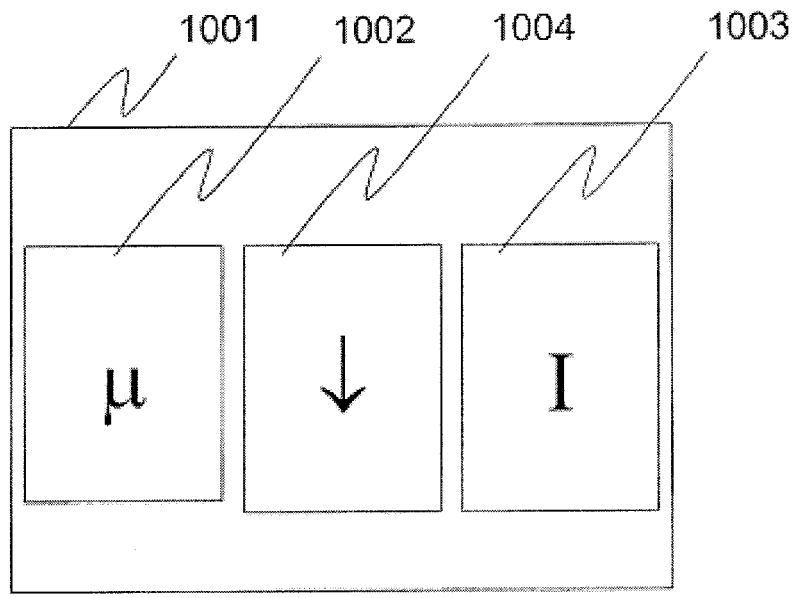
FIG. 10 illustrates some elements of a central frequency planner device in accordance with an embodiment of the invention.

FIG. 10 illustrates some elements of a central frequency planner device in accordance with an embodiment of the invention. The device (1001) is preferably collocated or connected to an OAM (Operations, Administration, and Maintenance) center of a wireless communications system. The device comprises processing circuitry (1002) adapted according to channel allocation as described above, including e.g. allocation based on collected statistics, and interface communication circuitry (1003) for communicating with various base stations including e.g. collecting statistics on user equipment location and performance and communicating frequency reuse-factors and channel resources such as physical resource blocks available in various cells or cell sections. Preferably, the device also comprises storage means (1004) of storing collected statistical data.

In this description, certain acronyms and concepts widely adopted within the technical field have been applied in order to facilitate understanding. The invention is not limited to units or devices due to being provided particular names or labels. It applies to all methods and devices operating correspondingly. This also holds in relation to the various systems that the acronyms might be associated with.

While the invention has been described in connection with specific embodiments thereof, it will be understood that it is capable of combining the various embodiments, or features thereof, as well as of further modifications. This specification is intended to cover any variations, uses, adaptations or implementations of the invention; not excluding software enabled units and devices, processing in different sequential order where non-critical, or mutually non-exclusive combinations of features or embodiments; within the scope of subsequent claims following, in general, the principles of the invention as would be obvious to a person skilled in the art to which the invention pertains.

The invention claimed is:

1. In a multi-user cellular wireless communications system providing one or more wireless services to devices in plural cells or cell sections forming areas of wireless service, a method of channel resource allocation comprising:
   for each of the plural cells or cell sections classifying the devices as either cell-center users (CCUs) and cell-edge users (CEUs), wherein a classification of a device is based upon geographical or electromagnetic propagation distance of the device from a base station serving the cell or cell section;
   determining, for each of the plural cells or cell sections, distribution statistics corresponding to a load value of the CEUs in the cell or cell section; and
   allocating communication channel resources to the plural cells or cell sections, wherein the allocation of communication channel resources of the CEUs in the plural cells or cell sections is provided according to the distribution statistics, wherein a first cell or cell section is allocated more communication channel resources than a second cell or cell section, wherein a load value of the CEUs of the first cell or cell section is greater than a load value of the CEUs of the second cell or cell section.

2. The method according to claim 1, wherein the distribution statistics of a cell or cell section represent geographical distribution, within the cell or cell section, of one or more of:
   (a) users,
   (b) user equipment devices, and
   (c) communications of such devices.

3. The method according to claim 2, wherein the distribution statistics are represented by one of:
   (a) one or more objective functions, or
   (b) a weighted sum of one or more objective functions.

4. The method according to claim 2, wherein the distribution statistics are associated with allocation of channel resources resulting in non-orthogonal signals of to two or more cells or cell sections.

5. The method according to claim 4, wherein a channel resource reuse factor of the CEUs is greater than 1.

6. The method according to claim 2, wherein allocating the communication channel resources is based on a cyclic expansion of assigned channel resources in relation to a predetermined value within a range of available channel resources.

7. The method according to claim 2 comprising adapting the channel resource allocation to distribution statistics varying over time.

8. The method according to claim 2, wherein classifying the devices comprises classifying the devices into at least two classes, wherein the two classes are assigned different channel resource reuse factors.

9. The method according to claim 2, further comprising:
   determining a set of decision variables representing a number of channel resources allocated to various cells or cell sections.

10. The method according to claim 9, further comprising determining a frequency or Physical Resource Blocks (PRB) allocation by evolutionary processing refining the set of decision variables recursively.

11. The method according to claim 1, wherein a channel resource reuse factor of the CEUs is greater than 1.

12. The method according to claim 1, further comprising:
   assigning a first channel resource reuse-factor to the CCUs;
   assigning a second channel resource reuse-factor to the CEUs.

13. The method according to claim 1, wherein the communication channel resources are defined in terms of frequency intervals.

14. The method according to claim 1, wherein the allocation of communication channel resources of the CEUs is based on adaptive partial reuse, in which communication channel resources are partially overlapping in different cells or cell sections.

15. An apparatus for channel resource allocation in a multi-user cellular wireless communications system providing one or more wireless services to devices in plural cells or cell sections forming areas of wireless service, the apparatus comprising:
   processing circuitry, configured to:
      for each of the plural cells or cell sections, classify the devices as either cell-center users (CCUs) and cell-edge users (CEUs), wherein a classification of a device is based upon geographical or electromagnetic propagation distance of the device from a base station serving the cell or cell section,
      determine, for each of the plural cells or cell sections, distribution statistics corresponding to a load value of the CEUs in the cell or cell section, and
      allocate communication channel resources to the plural cells or cell sections, wherein the allocation of communication channel resources of the CEUs in the plural cells or cell sections is provided according to the distribution statistics, wherein a first cell or cell section is allocated more communication channel resources than a second cell or cell section, wherein a load value of the CEUs of the first cell or cell section is greater than a load value of the CEUs of the second cell or cell section; and
   communication interface circuitry, configured to communicate the communication channel resources assignment to a base station serving a cell or cell section.

16. The apparatus according to claim 15, wherein the distribution statistics of a cell or cell section represent geographical distribution, within the cell or cell section, of one or more of:
   (a) users,
   (b) user equipment devices, and
   (c) communications of such devices.

17. The apparatus according to claim 15, further comprising:
   a data storage device, configured to store the distribution statistics.

18. The apparatus according to claim 15, wherein the data storage device stores statistics of an interference level.

* * * * *

UNITED STATES PATENT AND TRADEMARK OFFICE
CERTIFICATE OF CORRECTION

| | |
|---|---|
| PATENT NO. | : 8,843,148 B2 |
| APPLICATION NO. | : 13/779449 |
| DATED | : September 23, 2014 |
| INVENTOR(S) | : Koudouridis et al. |

It is certified that error appears in the above-identified patent and that said Letters Patent is hereby corrected as shown below:

Title Page, Item (71) Applicant, "Guangdong (CN)" should read -- Shenzhen (CN) --.

Signed and Sealed this
Third Day of February, 2015

Michelle K. Lee
*Deputy Director of the United States Patent and Trademark Office*